United States Patent
Ratosa et al.

(10) Patent No.: US 10,502,420 B2
(45) Date of Patent: Dec. 10, 2019

(54) GLOW PLUG WITH A SLEEVE TO RECEIVE THE HEATING ROD, EQUIPPED WITH A DISTAL TURNED-UP PART

(75) Inventors: Gverino Ratosa, Ankaran (SI); Jure Golob, Grahovo Ob Baci (SI); Urbas Janez, Tolmin (SI)

(73) Assignee: HIDRIA, RAZVOJ IN PROIZVODNJA AVTOMOBILSKIH, Ljubljana (SI)

( * ) Notice: Subject to any disclaimer, the term of this patent is extended or adjusted under 35 U.S.C. 154(b) by 1160 days.

(21) Appl. No.: 13/996,804

(22) PCT Filed: Dec. 21, 2011

(86) PCT No.: PCT/EP2011/073668
§ 371 (c)(1),
(2), (4) Date: Jun. 21, 2013

(87) PCT Pub. No.: WO2012/085140
PCT Pub. Date: Jun. 28, 2012

(65) Prior Publication Data
US 2013/0263808 A1    Oct. 10, 2013

(30) Foreign Application Priority Data
Dec. 22, 2010 (EP) .................... 10196609

(51) Int. Cl.
*F23Q 7/00* (2006.01)
*G01L 23/10* (2006.01)
(Continued)

(52) U.S. Cl.
CPC ............ *F23Q 7/001* (2013.01); *F02P 19/028* (2013.01); *F23Q 7/22* (2013.01);
(Continued)

(58) Field of Classification Search
CPC .......... F02P 19/028; F23Q 7/001; F23Q 7/22; F23Q 2007/002; G01L 23/10; G01L 23/18; G01L 23/22
(Continued)

(56) References Cited

U.S. PATENT DOCUMENTS 2,485,496 A * 10/1949 Korsgren .................. F23Q 7/08
219/270
7,351,935 B2 * 4/2008 Konishi .................. F23Q 7/001
123/145 A
(Continued)

FOREIGN PATENT DOCUMENTS

DE   10 2004 063749   7/2006
EP       2138819     12/2009
(Continued)

OTHER PUBLICATIONS

International Search Report dated Sep. 21, 2012, corresponding to PCT/EP2011/073668.

*Primary Examiner* — Mahmoud Gimie
*Assistant Examiner* — Joshua Campbell
(74) *Attorney, Agent, or Firm* — IPSILON USA, LLP

(57) ABSTRACT

A glow plug includes a heating rod (11), a plug body (13) having a receiving housing (14) of the heating rod, a receiving sleeve (16) which is fixed rigidly and impermeably to the proximal portion of the heating rod, and a load sensor (17). The receiving sleeve (16) has a distal extremity portion which is turned up on the proximal side towards the exterior, and connected rigidly and impermeably to the plug body, so as to form a turned-up part (26) which is elastic in flexion and impermeable.

16 Claims, 10 Drawing Sheets

Figure 1:
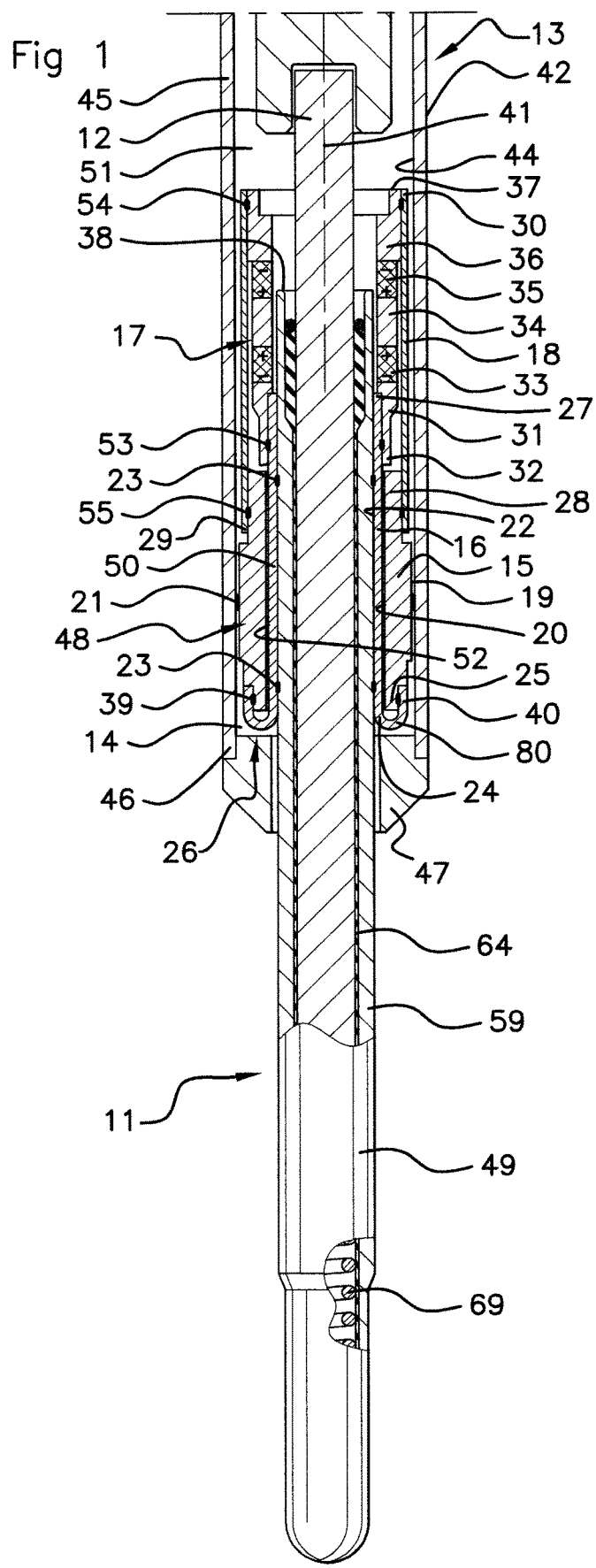

(51) Int. Cl.
*F23Q 7/22* (2006.01)
*G01L 23/18* (2006.01)
*G01L 23/22* (2006.01)
*F02P 19/02* (2006.01)

(52) U.S. Cl.
CPC ........ *F23Q 2007/002* (2013.01); *G01L 23/10* (2013.01); *G01L 23/18* (2013.01); *G01L 23/22* (2013.01)

(58) Field of Classification Search
USPC ............... 123/145 R; 361/264, 266
See application file for complete search history.

(56) References Cited

U.S. PATENT DOCUMENTS

| | | | |
|---|---|---|---|
| 7,431,003 | B2 | 10/2008 | Ludwig et al. |
| 2006/0053875 | A1 | 3/2006 | Haussner et al. |
| 2009/0056663 | A1 | 3/2009 | Ramond et al. |
| 2009/0165739 | A1* | 7/2009 | Kern ................ F23Q 7/001 123/145 R |
| 2009/0242540 | A1 | 10/2009 | Shinsuke et al. |
| 2010/0224613 | A1* | 9/2010 | Haussner ........... F23Q 7/001 219/267 |
| 2011/0005308 | A1* | 1/2011 | Kern ................ F23Q 7/001 73/114.16 |

FOREIGN PATENT DOCUMENTS

| | | | |
|---|---|---|---|
| EP | 2169375 | 3/2010 | |
| JP | 59060237 A * | 4/1984 | |
| WO | WO 2007096208 A1 * | 8/2007 | |
| WO | WO-2007096208 A1 * | 8/2007 | ............. F23Q 7/001 |
| WO | 2009053170 | 4/2009 | |
| WO | 2009/129791 | 10/2009 | |

\* cited by examiner

Fig 2
Fig 3
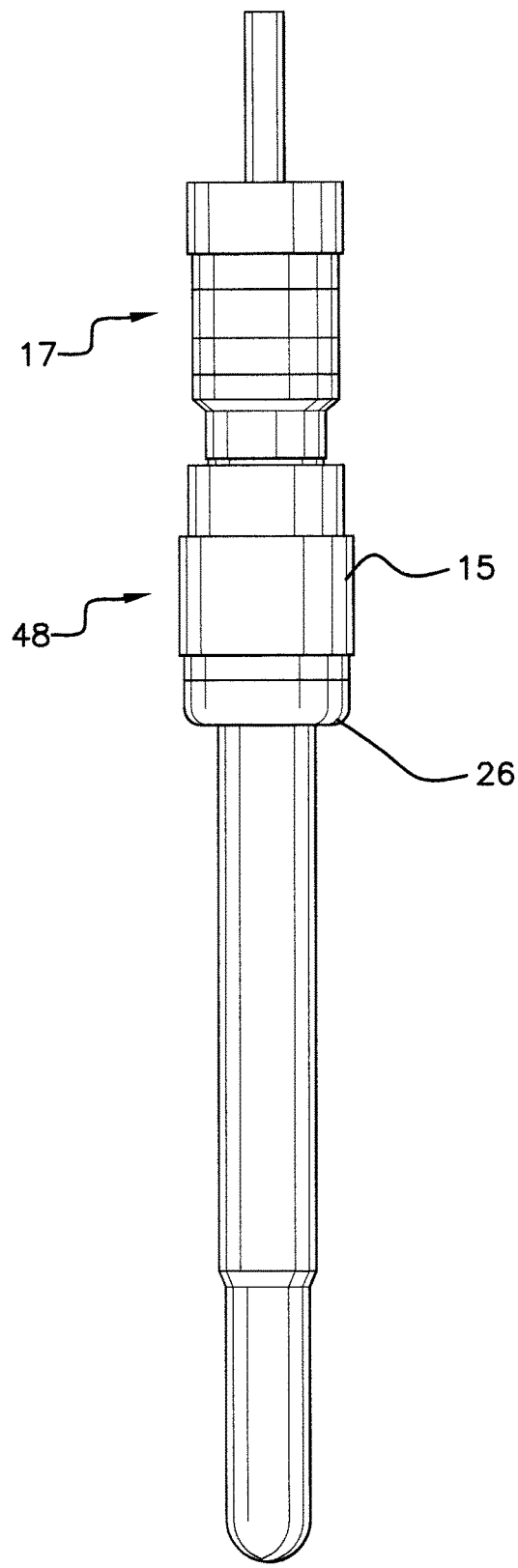
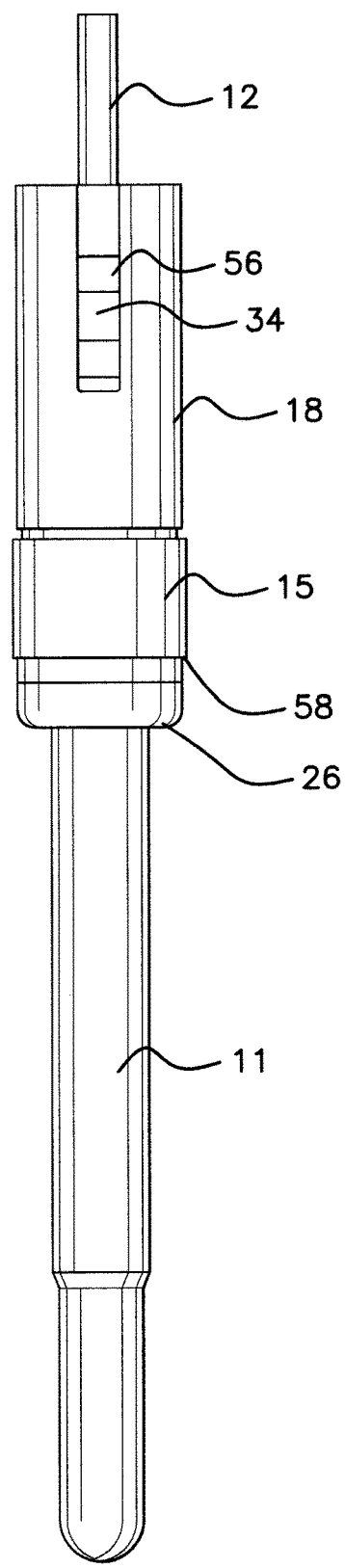

Fig 4
Fig 5
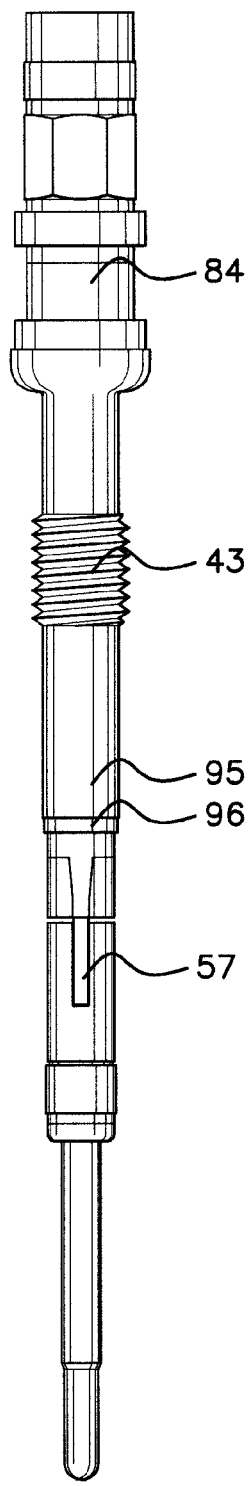
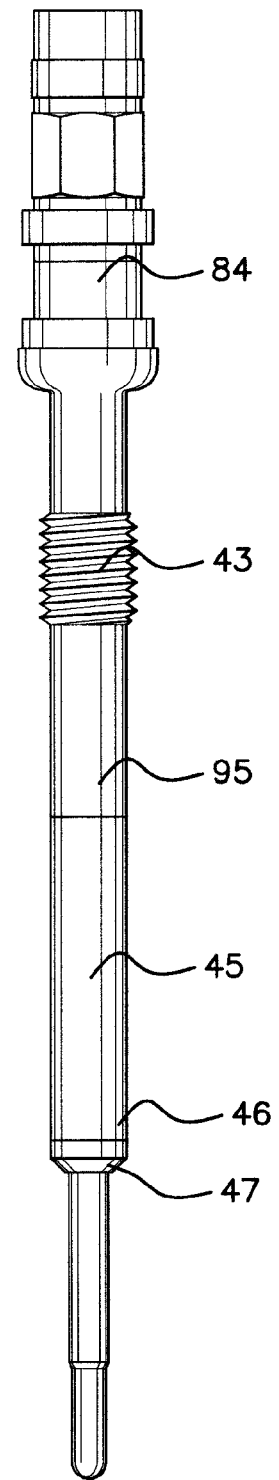

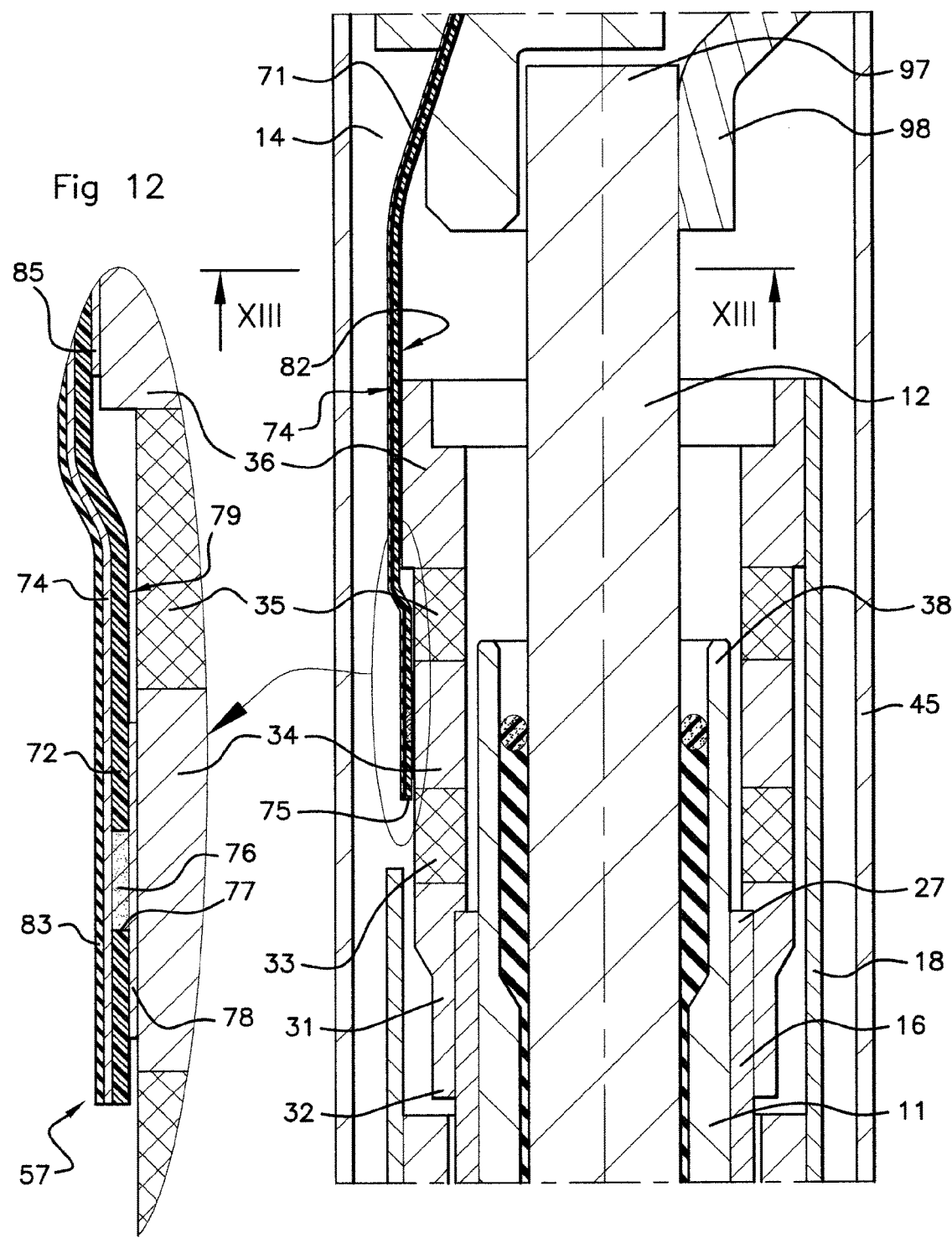

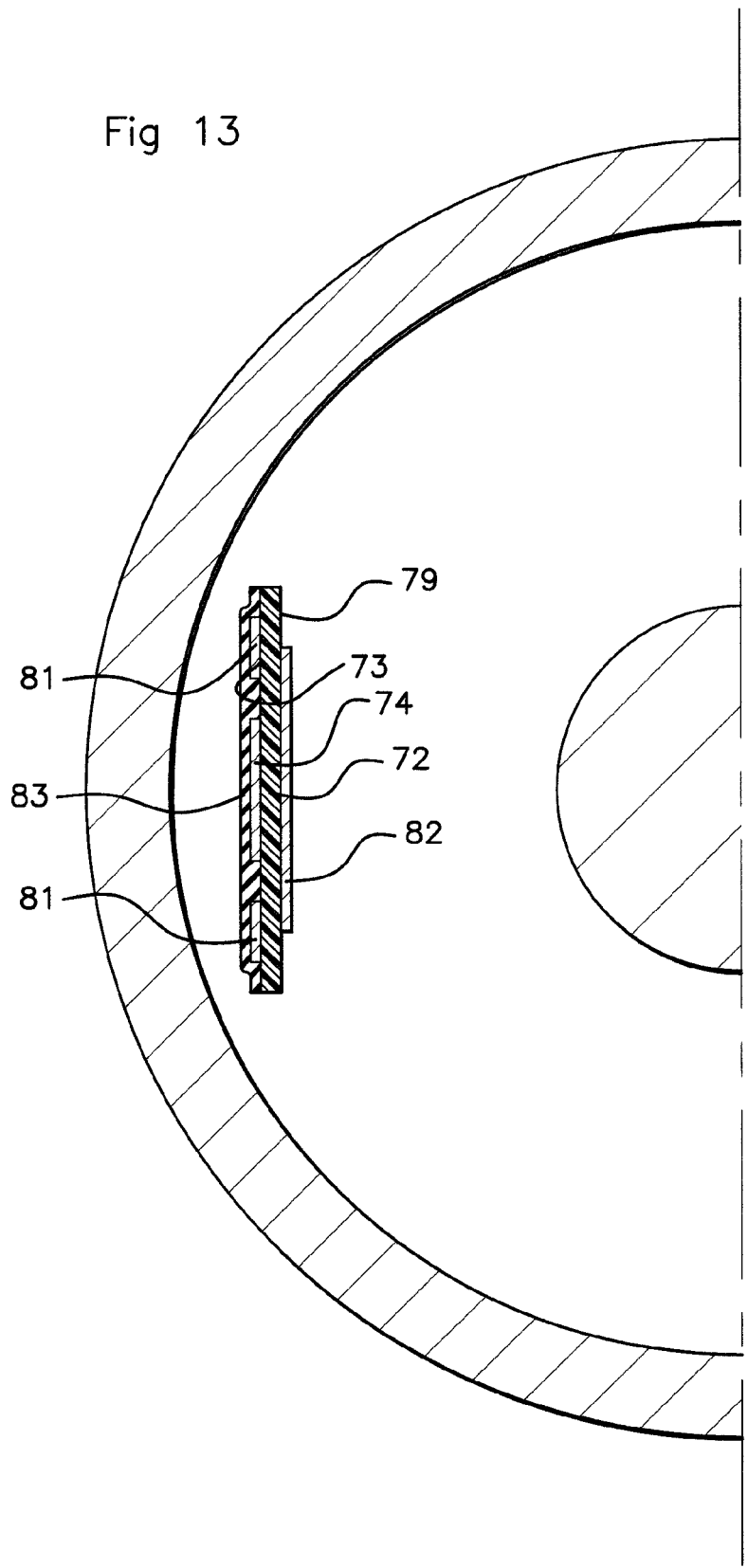

GLOW PLUG WITH A SLEEVE TO RECEIVE THE HEATING ROD, EQUIPPED WITH A DISTAL TURNED-UP PART

The invention concerns a glow plug, in particular for a diesel engine, including a heating rod, and an integrated load sensor which makes it possible to carry out measurements of the cylinder pressure.

A heating rod of a glow plug is in the form of a rigid rod or bar, which extends longitudinally according to an axis, called the principal axis, from the body of the plug into the combustion chamber. Throughout the text, the term "distal" and its derivatives designate directions, elements or parts which are situated axially on the side of the free extremity of the heating rod, which is intended to extend into the combustion chamber, and the term "proximal" and its derivatives designate directions, elements or parts which are situated axially on the opposite side, i.e. towards the connection towards the outside of the cylinder head of the engine on which the glow plug is intended to be fitted.

A heating rod also extends from the proximal side into the plug body, and has a proximal extremity which is equipped with an electrical connection which forms a first electrical power supply terminal of the heating rod, in general with an electrode which extends axially beyond the proximal extremity of the heating rod. Throughout the text, a heating rod power supply electrode, when it is provided, is not considered to form an integral part of the heating rod itself.

The plug includes a cylindrical plug body having a threaded external portion for fitting on a cylinder head, and at the distal portion of the plug body, called the plug head, a cylindrical internal housing for receiving a proximal portion of the heating rod extending from said proximal extremity, said housing having an opening for the passage of the heating rod such that the latter extends axially, projecting (on the distal side) beyond said proximal portion and the opening, and having a heating distal portion as far as the distal extremity of the heating rod.

The heating rod is either in the form of a ceramic bar which is machined to shape and set (fixed by brazing or inserted by force (bracing)) into an external metal tube to be fitted into the plug body; or in the form of a metal tube which is closed at its distal extremity, of standardised invariable dimensions (this metal tube receiving a electrical power supply electrode). Whatever the embodiment, the heating rod therefore always includes an external metal tube. The exterior diameter of this external metal tube is, in the proximal portion of the heating rod which extends into the plug body, at least approximately constant, and according to the standards, must equal 4 mm.

The plug also includes a device for mounting said proximal portion of the heating rod in the plug head, i.e. in said receiving housing, this mounting device being able to:
permit axial translation movements of the heating rod relative to the plug body, so that the cylinder pressure can be measured by a load sensor which is integrated in the plug head,
ensure impermeability between the heating rod and the plug body, in such a way as to delimit a proximal zone of the receiving housing which is not exposed to the atmosphere of the combustion chamber,
be compatible with and/or providing the various electrical links to the heating rod and the load sensor.

Various solutions have been proposed for implementing this mounting device. In general, the mounting device includes an elastically deformable impermeability membrane which connects the heating rod to the plug body. For this purpose, EP2138819, EP2169375 provide a membrane which connects the plug head and the distal part of the heating rod, this membrane being, at its proximal extremity, flared in the form of an L (axial cross-section) and consequently having a certain elasticity. US 20090056663, WO 2009053170 provide flared membranes in the general form of an S (axial cross-section). US 20060053875 and U.S. Pat. No. 7,431,003B2 provide a membrane in the form of elastic bellows, US 2009/0242540 provides a tubular deformable membrane.

All these known solutions have the disadvantage of relatively complex assembly, which in particular involves the insertion of the mounting device around the heating rod from the distal extremity of the latter, at the risk of damaging it.

Similarly, these elastically deformable impermeability membranes are relatively complex to manufacture, and have insufficient mechanical properties, in particular from the point of view of their fatigue strength and/or excessive stiffness. Thus the known membranes, for a minimum thickness making it possible to resist fatigue, are too stiff. Also, in most cases, the membrane has portions which are subjected to high mechanical stresses and exposed to the thermochemical oxidation of the combustion chamber. Also, in numerous cases, there is the problem of the mechanical link between the impermeability membrane and the heating rod, which must be sufficiently resistant to the great stresses to which it is subjected and to fatigue.

Similarly, these known membranes most often have unsatisfactory thermal properties. In this regard, it is important to favour thermal transfer between the heating rod and the plug body via the mounting device, and in particular the impermeability membrane. But known membranes often (e.g. WO 2009053170) have a small contact surface with the heating rod and/or a large thermal length between the heating rod and the plug body.

Additionally, in these known solutions, the mounting device unit is itself relatively complex and fragile.

The invention is thus aimed at overcoming these disadvantages, by proposing a glow plug in which the mounting device simultaneously has improved mechanical and thermal properties, greater reliability and greater simplicity of assembly and manufacture.

To this end, the invention concerns a glow plug comprising:
a heating rod having an extremity, called the proximal extremity, which is equipped with an electrical power supply connection of the heating rod,
a plug body, having a housing, called a receiving housing, receiving a proximal portion of the heating rod, the latter having a distal portion which extends axially, projecting beyond a distal extremity of the plug body,
a mounting device for mounting the proximal portion of the heating rod in said receiving housing, this mounting device including a receiving sleeve which is fixed rigidly and impermeably around said proximal portion of the heating rod, and being arranged to:
permit axial translation movements of the heating rod relative to the plug body, and
ensure impermeability between the heating rod and the plug body, in such a way as to delimit a proximal zone of the receiving housing which is not exposed to the atmosphere of a combustion chamber of an engine which receives the glow plug,
a load sensor which extends entirely in said proximal zone of the receiving housing, characterized in that the receiving sleeve has a distal extremity portion which is turned up on the proximal side towards the exterior, and connected rigidly and impermeably to the plug body, the thus formed turned-up part being elastically deformable in flexion, and having suitable elasticity in flexion to make axial translation movements of the heating rod relative to the plug body possible, while ensuring impermeability at the distal extremity of the plug body.

Such a distal turned-up part, which is elastic in flexion and impermeable, of the receiving sleeve has numerous advantages, and makes it possible to solve the various problems mentioned above simultaneously.

In particular, it makes it possible to obtain a stiffness coefficient of a particularly appropriate value, in particular low enough to make significant axial movements possible under the effect of differential thermal expansion, for a thickness which is nevertheless sufficiently great and with the use of an appropriate constituent material which can be chosen so as to have sufficient thermal expansion to allow an efficient transmission of the calories towards the cylinder head, and regarding the other mechanical characteristics, in particular to be able to resist fatigue. In particular, advantageously and according to the invention, the turned-up part (and preferably the whole receiving sleeve) can be formed of stainless steel with high characteristics, in particular having a Young's modulus greater than 150 GPa, in particular of the order of 200 GPa, an elastic limit greater than 600 MPa, e.g. of the order of 800 MPa, and a fatigue strength (maximum stress for which the number of cycles without breakage is infinite) of at least 300 MPa, e.g. of the order of 400 MPa. For example, it may be of 17-4PH steel or inconel steel.

Also, with such a turned-up part, the greatest stresses, which develop (for deformations in flexion of the turned-up part, in both axial traction and axial compression of the heating rod) in the regions of greatest curvature, are situated towards the proximal face of the turned-up part in contact with the atmosphere, but not in contact with the corrosive gases of the combustion chamber. On the contrary, the distal face of the turned-up part in contact with the combustion chamber is subjected to lower stresses when the heating rod moves.

Also, implementation of an elastic impermeability membrane in the form of such a turned-up part makes it possible to extend the receiving sleeve in its tubular principal part in contact with the heating rod, on the proximal side, over as long a distance as necessary to ensure optimal fixing of the receiving sleeve relative to the heating rod. In particular, the receiving sleeve has a tubular principal part which extends axially in contact with the heating rod over an axial length which is greater than the diameter of the heating rod, in particular greater than 10 mm, e.g. of the order of 15 mm. Additionally, from the thermal point of view, this tubular principal part of the receiving sleeve ensures a large contact surface with the heating rod, whereas the turned-up part has a low thermal conduction distance between this tubular principal part of the receiving sleeve and the plug body to which the turned-up part is connected (directly or via one or more intermediate parts).

Furthermore, with such a turned-up part, the receiving sleeve can easily be inserted around the heating rod by its proximal extremity, without the risk of damaging the critical and fragile distal portion of the latter.

Similarly, such a receiving sleeve with a turned-up part can be manufactured by stamping, with the benefit of good mechanical reliability and low cost.

In a glow plug according to the invention, according to the embodiment which is otherwise chosen for the mounting device, the turned-up part can be connected to the plug body either directly (e.g. by welding on an internal face facing the receiving housing), or indirectly via one or more parts. In any case, the turned-up part is connected rigidly to the plug body, so that it is integrated with the latter at least regarding axial translation.

In a particularly advantageous embodiment, a glow plug according to the invention is also characterized in that the mounting device includes a fixing ring having a face, called the first fixing face, which is fixed rigidly and impermeably to an internal wall facing the receiving housing, said receiving sleeve being guided in axial translation in the fixing ring, said receiving sleeve having a face, called the second fixing face, which is fixed rigidly and impermeably around said proximal portion of the heating rod, and in that said turned-up distal extremity portion of the receiving sleeve is connected to a distal extremity of the fixing ring, the receiving sleeve and the fixing ring being arranged for ensuring impermeability between the heating rod and the plug body at the distal extremity of the latter. Such a fixing ring makes possible simultaneously good guidance of the receiving sleeve, good fixing of the turned-up part and of the whole within the receiving housing of the plug body, perfect impermeability with respect to the corrosive atmosphere of the combustion chamber, and optimisation of the thermal transfers between the heating rod and the plug body on the one hand via the turned-up part, on the other hand by radial thermal conduction between the two fixing faces, which preferably at least partially face each other radially.

It also makes it possible to fit the load sensor, which can advantageously be embodied in the form of a tubular sleeve which is equipped with sensitive piezoelectric elements. Such a load sensing sleeve can be mounted, on the one hand, with a distal extremity which is fixed on a proximal extremity of the receiving sleeve, and with a proximal extremity which is connected to a proximal extremity of the fixing ring, in particular via an external linking tube.

The invention is also as compatible with a heating rod with a ceramic bar as with a heating rod in the form of a metal tube. Thus, in a first variant embodiment according to the invention, the heating rod being in the form of a ceramic bar set in an external metal tube, said receiving sleeve extends around a proximal portion of the external metal tube of the heating rod. In a second variant embodiment according to the invention, the heating rod being essentially in the form of a metal tube, said receiving sleeve extends around the proximal portion of this metal tube.

Additionally, the turned-up part of the receiving sleeve of a glow plug according to the invention can be the subject of different embodiments. In particular, the angular amplitude according to which the turned-up part is implemented relative to the receiving sleeve can vary. Advantageously, a glow plug according to the invention is characterized in that the receiving sleeve includes a tubular principal part which is fixed rigidly and impermeably around said proximal portion of the heating rod, and in that said turned-up distal extremity portion of the receiving sleeve is turned up at a turned-up part angle greater than 120° and less than 240° relative to said tubular principal part. Preferably, advantageously and according to the invention, the turned-up part angle is of the order of 180°, said turned-up distal extremity portion of the receiving sleeve having a peripheral tubular ring which extends from the proximal side parallel to said tubular principal part. Also, advantageously, a glow plug according to the invention is characterized in that said turned-up part has a proximal extremity portion and a linking portion between said proximal extremity portion and a tubular principal part of the receiving sleeve which is fixed rigidly and impermeably around said proximal portion of the heating rod, and in that said linking portion has, in cross-section in a radial plane, a generally curved form with continuous curvature, in particular in the general form of an arc of a circle, preferably of a semi-circle for a 180° turned-up part (the distal extremity portion of the receiving sleeve having, in cross-section in a radial plane, a general form of a U, or J when the tubular principal part is considered).

Additionally, the proximal extremity portion of the turned-up part is preferably formed by said peripheral tubular ring of the turned-up distal extremity portion. There is nothing to hamper other embodiments, in which this peripheral tubular ring is prolonged on the proximal side by other portions of non-tubular form, e.g. a flared truncated cone. Similarly, there is nothing to hamper the proximal extremity portion of the turned-up part to be in a form other than that of a tubular ring, e.g. in the form of a flared truncated cone.

Additionally, advantageously and according to the invention, the receiving sleeve has a constant thickness from its proximal extremity to its turned-up distal extremity portion. Also, advantageously according to the invention, the distal extremity of the fixing ring has a receiving recess which is arranged for receiving a proximal extremity portion of said turned-up part, and said proximal extremity portion of said turned-up part is welded into the recess of the fixing ring. This recess can be implemented at a (radial) depth corresponding in total or not to the thickness of the proximal extremity portion of the turned-up part.

The invention also concerns a glow plug, which is characterized in combination by all or some of the characteristics mentioned above or below.

Figure 6:
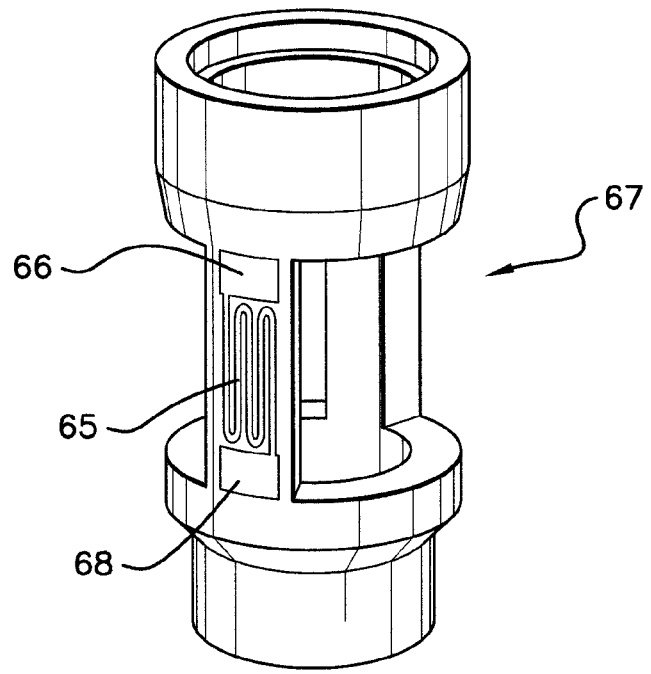
Figure 8:
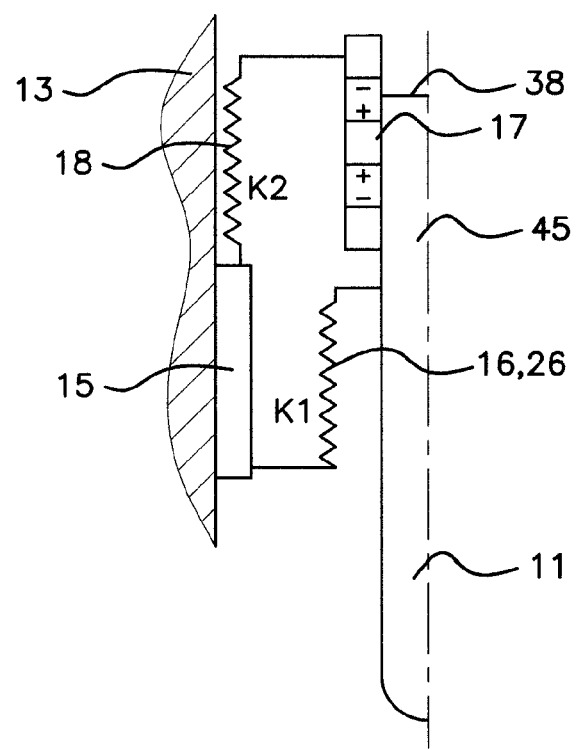
Figure 7:
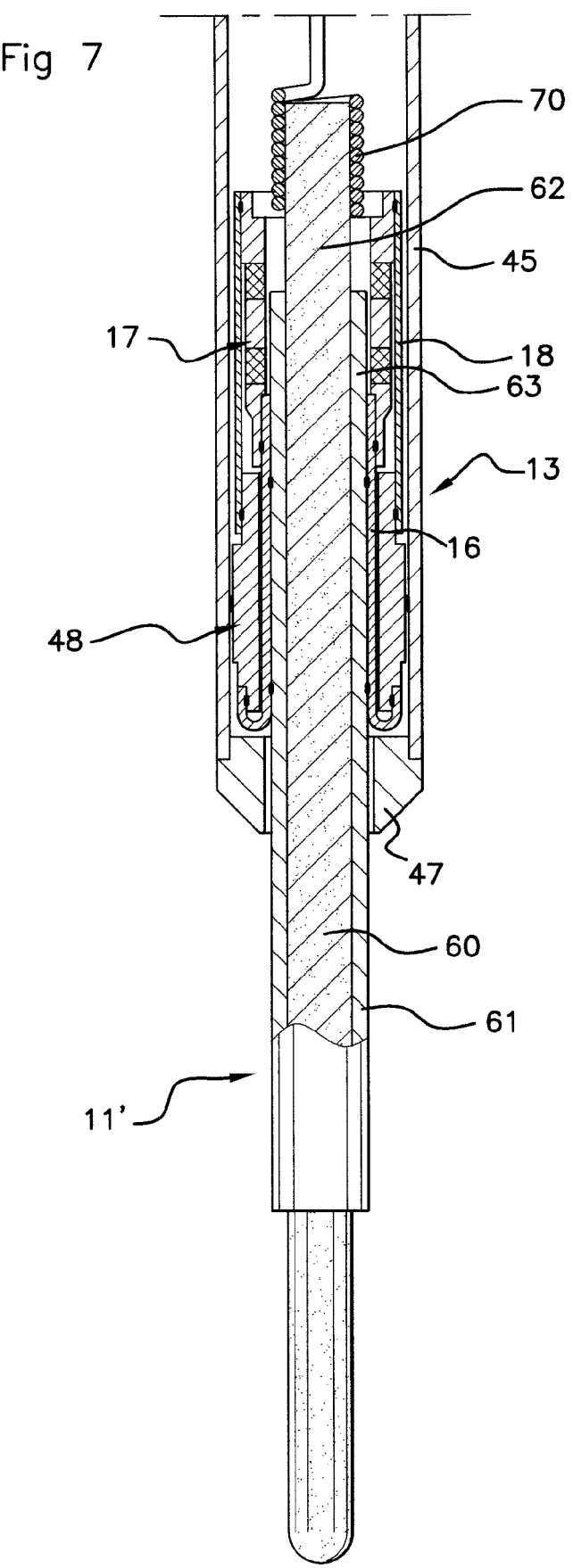
Figure 9:
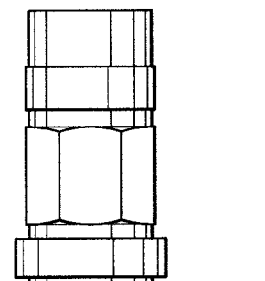
Figure 10:
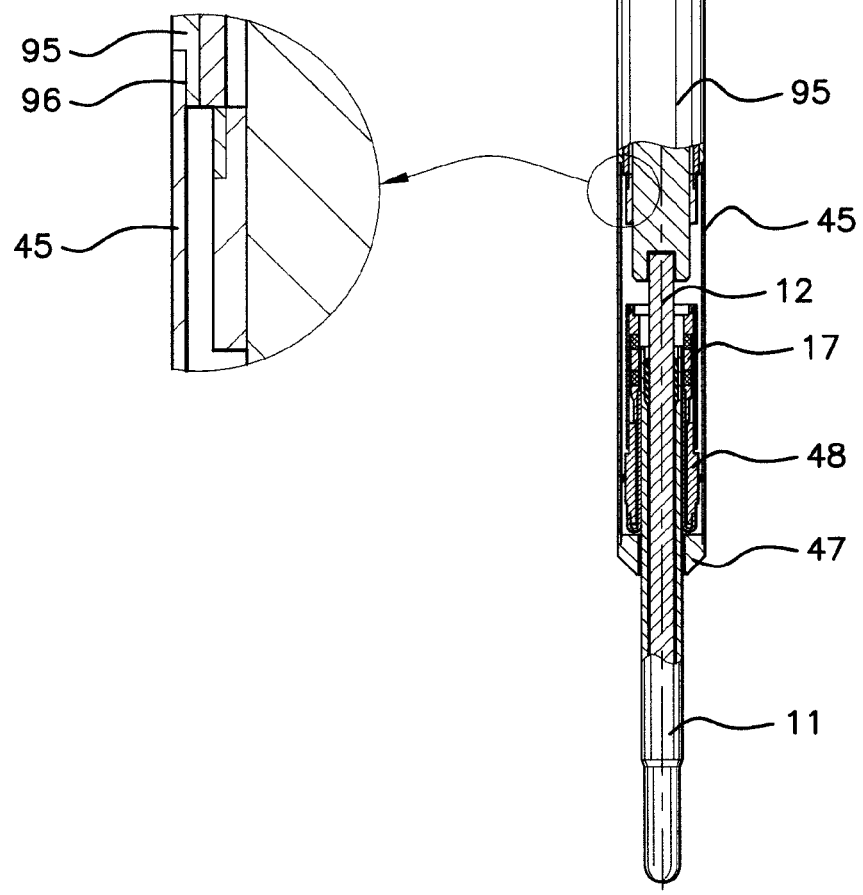
Figure 14:
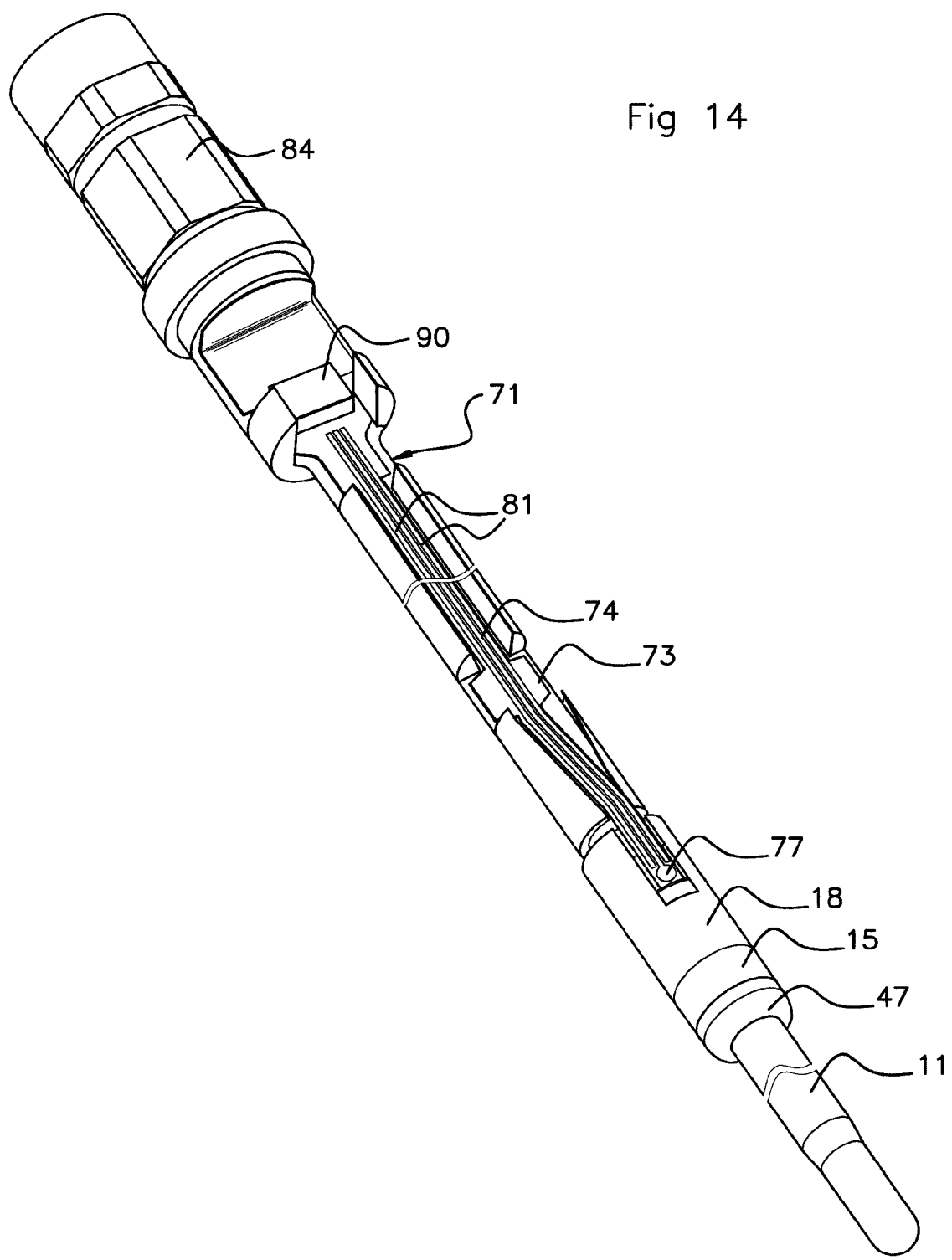
Figure 15:
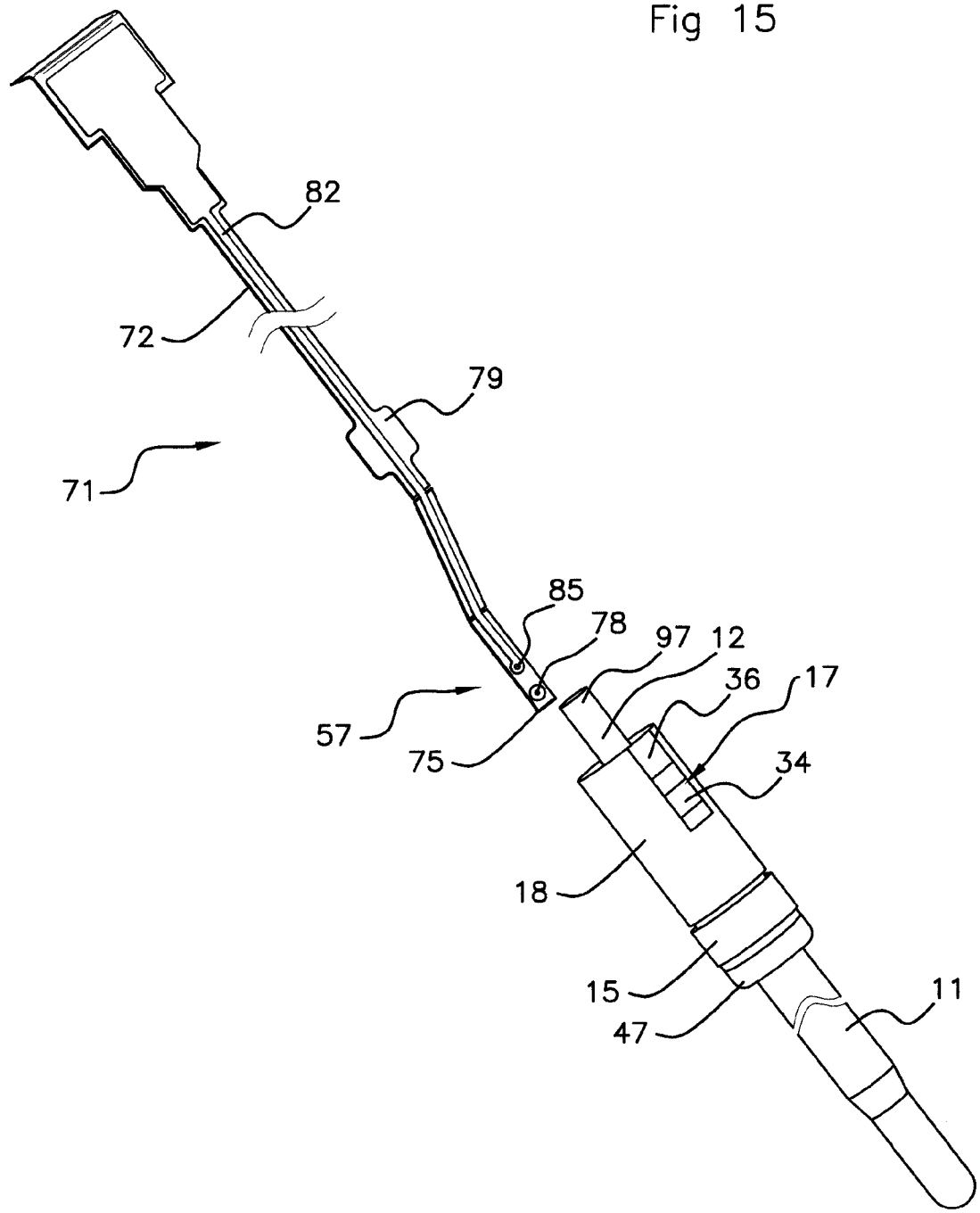

Other objects, characteristics and advantages of the invention will appear on reading the following description, which refers to the attached figures, which represent embodiments of the invention as non-limiting examples, and in which:

FIG. 1 is a schematic view in axial cross-section of the distal part of a glow plug according to a first embodiment of the invention, FIGS. 2 to 5 are schematic views in elevation of different stages of manufacture of a glow plug according to the first embodiment of the invention, FIG. 6 is a schematic view in perspective of a load sensing sleeve according to a variant embodiment conforming to the invention, FIG. 7 is a schematic view in axial cross-section of the distal part of a glow plug according to a second embodiment of the invention, FIG. 8 is a diagram illustrating the functional kinematics of a glow plug according to the invention, FIG. 9 is a schematic view in partial axial cross-section of a glow plug according to the first embodiment of the invention, FIG. 10 is a view of a detail of FIG. 9, FIG. 11 is a schematic view in axial cross-section of the detail of the electrical connection of the sensor link of a glow plug according to the first embodiment of the invention, FIG. 12 is a schematic view of a detail of FIG. 11, FIG. 13 is a schematic cross-section view according to the line XIII-XIII of FIG. 11, FIG. 14 is a schematic view in partially cut-away perspective of a glow plug according to the first embodiment of the invention, showing in particular the first face facing towards the exterior of the flexible connector which forms the sensor link, FIG. 15 is a schematic detail view in perspective of the second face, facing towards the interior, of the distal extremity of the flexible connector.

A glow plug according to the invention includes a heating rod 11 which, in the example of FIG. 1, is of the so-called all-metal type, consisting essentially of a metal tube 59. This metal tube 59 is thus a metal tube which can be called peripheral, and receives an electrical power supply electrode 12 (which is not considered to form an integral part of the heating rod itself), so that power can be supplied to it by a current which is capable of heating at least one electrical resistance 69 which is arranged at the distal extremity of the electrode 12 within the metal tube 59, and capable of generating (by Joule effect) heating of the distal extremity of the heating rod 11. The electrode 12 extends into the metal tube 59, on a certain length of the latter, and is insulated from it by an inserted insulating material 64. The electrode 12 extends axially in a projection beyond the proximal extremity 38 of the heating rod 11. The electrode 12 has a proximal extremity 97 which is connected to an electrical power supply connector 98. This heating rod 11 is received in a plug body 13, which for this purpose forms a receiving housing 14.

The heating rod 11 extends longitudinally according to a principal axis 41, which is also an axis of the plug body 13, of the receiving housing 14, and of a threaded portion 43 of the external wall 42 of the plug body 13, said threaded portion being configured and intended to make it possible to fix the glow plug in an internally threaded hole which passes through the cylinder head of an engine. Throughout the text, the terms "axial" and "radial" and their derivatives refer to the principal axis 41.

The plug body 13, its external wall 42, the receiving housing 14 and the internal wall 44 of the plug body 13, which delimits the receiving housing 14, is preferably rotationally symmetrical around the principal axis 41, but any other form which does not conform to such a symmetry of revolution is equally conceivable. That being so, the plug body 13, in its distal portion forming the receiving housing 14, is in the form of a tube 45, the internal wall 44 of which is cylindrical (rotationally symmetrical or not, i.e. its base is not necessarily circular) relative to the principal axis 41. This tube 45 has a distal extremity 46, which is closed by a truncated washer 47, which forms the distal extremity of the plug body 13. The receiving housing 14 thus extends from the truncated washer 47 axially in the proximal direction.

The heating rod 11 extends axially in the distal direction beyond the plug body 13 and the washer 47, through the central opening of the latter, and has a distal portion 49 which is intended to extend into the atmosphere of the combustion chamber. The heating rod 11 also has a proximal portion 50, which extends into the receiving housing 14.

The receiving housing 14 contains a mounting bush 48 of the heating rod 11. The function of this mounting bush 48 is to fix the heating rod 11 solidly relative to the plug body 13, while making slight axial translation movements of the heating rod 11 relative to the plug body 13 possible, under the effect of variations of the pressure of the atmosphere of the combustion chamber. The mounting bush 48 also includes means 15, 16 of impermeability, ensuring impermeability between the heating rod 11 and the plug body 13, in such a way as to delimit a proximal zone 51, which is not exposed to the atmosphere of the combustion chamber, of the receiving housing 14.

The mounting bush 48 includes a fixing ring 15, which is cylindrical overall and has a cylindrical wall 19, which faces radially towards the exterior and is fixed rigidly and impermeably to the internal wall 44 (which faces radially towards the interior) of the receiving housing 14, in particular by at least one peripheral weld 21, which can be implemented by laser through the thickness of the tube 45. The wall 19 of the fixing ring 15 thus forms a first fixing face of the mounting bush 48, to the internal wall 44 facing the receiving housing 14.

The fixing ring 15 has an internal cylindrical wall 20, which forms a hole which passes through the fixing ring 15 axially. The internal diameter of this internal wall 20 of the fixing ring 15 is greater than the peripheral diameter of the proximal portion 50 of the heating rod 11 facing it, so as to make a space radially for insertion of a receiving sleeve 16 between the fixing ring 15 and the proximal portion 50 of the heating rod 11.

The receiving sleeve 16 has a tubular principal part in the form of a fine metal tube. This fine metal tube is preferably of stainless steel with high characteristics, in particular having a Young's modulus greater than 150 GPa, in particular of the order of 200 GPa, an elastic limit greater than 600 MPa, e.g. of the order of 800 MPa, and a fatigue strength (maximum stress for which the number of cycles is infinite) of at least 300 MPa, e.g. of the order of 400 MPa. For example, it is of 17-4PH steel or inconel steel.

The tubular principal part of the receiving sleeve 16 has an internal cylindrical wall 22 (facing radially towards the interior), the internal diameter of which corresponds to that of the proximal portion 50 of the heating rod 11 (in particular typically of 4 mm according to the standards in force), so as to be in contact with this proximal portion 50 and fixed rigidly and impermeably to the latter by at least one peripheral weld 23 (in particular two fillets of peripheral weld in the example shown in FIG. 1). The wall 22 of the receiving sleeve 16, which is fixed rigidly and impermeably around the proximal portion 50 of the heating rod 11, thus forms a second face 22 for fixing the mounting bush 48 on the heating rod 11.

The tubular principal part of the receiving sleeve 16 has a peripheral cylindrical wall 52 which faces radially towards the exterior, i.e. facing the internal wall 20 of the fixing ring 15. A very small gap—in particular of the order of 0.2 mm—is created radially between these cylindrical facing walls 52, 20, so as to make axial translation movements of the receiving sleeve 16 relative to the fixing ring 15 possible. The receiving sleeve 16 has a distal extremity 24 which is fixed rigidly and impermeably—in particular by at least one peripheral weld 39—to the distal extremity 25 of the receiving ring 15.

The distal extremity 24 of the receiving sleeve 16 is turned up towards the exterior and the proximal side, so as to form a turned-up part 26 which passes around the distal extremity 25 of the receiving ring 15, this turned-up part 26 having a proximal extremity portion 40 which is fixed rigidly and impermeably by said peripheral weld 39 to the distal extremity of the wall 19, which faces radially towards the exterior of the fixing ring 15. Preferably, a peripheral recess is made in the face which faces radially towards the exterior of this distal extremity of the wall 19 of the fixing ring 15, to receive the proximal extremity portion 40 of the turned-up part 26, so as to avoid all excess thickness. This proximal extremity portion 40 of the turned-up part 26 forms an extremity peripheral tubular ring 40 extending from the proximal side, and parallel to said tubular principal part of the receiving sleeve 16, when the turned-up part 26 is of 180°. It should be noted that, in a variant (not shown), the turned-up part 26 may be made not at 180° relative to the tubular principal part of the receiving sleeve 16, but according to a turned-up part angle which is greater or less than 180°. However, the turned-up part angle (of the turned-up part 26 relative to the tubular principal part of the receiving sleeve 16) is greater than 120° and less than 240°. The axial height of said proximal extremity portion 40 (in particular the extremity tubular ring 40) is less—in particular much less—than the axial height of the tubular principal part of the receiving sleeve 16. In other words, the proximal extremity of the turned-up part 26 is offset from the distal side relative to the proximal extremity of the tubular principal part of the receiving sleeve 16.

This turned-up part 26, which can be implemented, for example, by pressing, has, between the tubular principal part of the receiving sleeve 16 and the turned-up extremity portion 40 of the proximal side, a curved-back linking portion 80, and this curved-back linking portion has a section in a radial plane which is curved and has continuous curvature, in particular in the general form of an arc of a circle, preferably of a semi-circle or U (the linking portion 80 being in the general form of half a torus), or J when the tubular principal part is considered. As a variant, a linking portion 80 having a section of non-constant curvature, e.g. in the general form of a portion of an ellipse or other, can be provided.

This turned-up part 26 thus forms an extremity portion of the receiving sleeve 16 having elasticity in flexion, and thus allowing axial translation movements of the heating rod 11 relative to the fixing ring 15 (and thus relative to the plug body 13) in a sufficiently large amplitude range, and with elastic retraction of the heating rod in axial translation according to a predetermined stiffness coefficient $K1$, which can be adjusted to a relatively low value by an appropriate choice of the material forming the receiving sleeve 16 and its thickness. Preferably, the receiving sleeve 16, including the turned-up part 26, has approximately constant thickness, e.g. of the order of 0.35 mm.

It should be noted that the turned-up part 26 of the distal extremity of the receiving sleeve 16 has numerous advantages. In particular, such a turned-up part 26 can be implemented simply by pressing. It makes it possible to insert the receiving sleeve via the proximal extremity of the heating rod 11, with no risk of damaging the latter. When deformation occurs, the stresses within the turned-up part 26 are at their maximum value on the proximal side, which is not exposed to the corrosive atmosphere of the combustion chamber. Despite relatively large thickness, in particular of the order of 0.35 mm, a relatively low coefficient of elasticity is obtained, making relatively large movements of the heating rod 11 possible. It also makes it possible to implement a thermally conductive element of small dimensions, and thus of low thermal resistance, between the heating rod 11 and the plug body 13, at the distal extremity of the latter.

The tubular principal part of the receiving sleeve 16 passes axially throughout the length of the fixing ring 15, and extends slightly beyond the proximal extremity 28 of the latter. The cylindrical walls 52, 20 facing them, and the small gap (typically of the order of 0.2 mm) which separates them, as well as the materials forming the receiving sleeve 16 and fixing ring 15, which are metallic and thermally conductive, facilitate thermal exchanges between the proximal portion 50 of the heating rod 11 and the plug body 13 radially, at the level of the receiving sleeve 16 and the fixing ring 15. In other words, a radial thermal bridge is thus implemented by the receiving sleeve 16 and the fixing ring 15. The result, in particular, is that the elements in the receiving housing 14, beyond the receiving sleeve 16 and the fixing ring 15 of the proximal side, including the load sensing sleeve 17 described below, are less exposed to the high temperatures of the heating rod 11 and the combustion chamber.

The proximal extremity 27 of the receiving sleeve 16 comes into contact with a distal extremity 32 of a load sensing sleeve 17, which is tubular overall, and the distal extremity 32 extends axially, parallel to a distal extremity portion of the receiving sleeve 16, entirely around the proximal portion 50 (of greater diameter, equal to 4 mm) of the metal tube 59 of the heating rod 11. The load sensing sleeve 17 has symmetry of revolution around the axis 41, and is coaxial to the heating rod 11 and the receiving housing 14. The load sensing sleeve 17 adjoins, axially and directly, the bush 48 for mounting axially on the proximal side.

The load sensing sleeve 17 includes, in the embodiment shown in FIG. 1, a distal ring 31 which is fixed rigidly to the peripheral wall of the receiving sleeve 16 by at least one peripheral weld 53. This distal ring 31 is fitted onto the proximal extremity 27 of the receiving sleeve 16, and has, at its proximal extremity, a radial gap with the peripheral wall of the heating rod 11 (more precisely of the metal tube 59 of the heating rod 11).

The distal extremity 32 of the distal ring 31 forms a first axial extremity of the load sensing sleeve 17, which is connected rigidly to the heating rod 11—more precisely to the metal tube 59 of the heating rod 11—via the receiving sleeve 16. This distal extremity 32 of the load sensing sleeve 17 is thus driven in axial translation by the movements of the heating rod 11 according to the axis 41, at least in the proximal direction, and in the shown embodiments, in both directions.

This distal extremity 32 of the load sensing sleeve 17 is axially at a distance from the proximal extremity 28 of the fixing ring 15, so that it does not come to a limit stop against the latter in the course of axial movements of the heating rod 11. But the distal extremity 32 of the distal ring 31 is as near as possible to the fixing ring 15, so that the load sensing sleeve 17 is directly above the fixing ring 15 on the proximal side.

Above the distal ring 31 (on the proximal side) is a first washer 33 of piezoelectric material, above that is a central washer 34 of electrically conductive material, above that is a second washer 35 of piezoelectric material, and above that is a proximal ring 36.

The various rings and washers 31, 33, 34, 35, 36 of the load sensing sleeve 17 which are stacked in this way have at least approximately the same internal diameter, which is slightly greater than the peripheral diameter of the metal tube 59 of the heating rod 11, so that they do not come into contact with the latter. Their radial thickness is as low as possible, so that they can be accommodated in the receiving housing 14 around the proximal portion 50 of the metal tube 59 of the heating rod 11 (having a peripheral diameter of 4 mm), while nevertheless allowing detection of the axial compression stresses which are generated within the piezoelectric washers 33, 35. Typically, the radial thickness of the piezoelectric washers 33, 35 is of the order of 1 mm.

The proximal ring 36 of the load sensing sleeve 17 has a proximal extremity 37 which also constitutes a second proximal axial extremity of the load sensing sleeve 17. In the embodiment shown in FIG. 1, the proximal extremity 37 of the load sensing sleeve 17 is beyond, on the proximal side, the proximal extremity 38 of the heating rod 11, the heating rod 11 not passing axially entirely through the load sensing sleeve 17. Nevertheless, it should be noted that the load sensing sleeve 17 does not extend entirely around the electrical power supply electrode 12, and is in the most distal possible position within the receiving housing 14 and the proximal side of the mounting bush 48, the latter being at the distal extremity of the receiving housing 14.

The proximal ring 36 of the load sensing sleeve 17 has a radial thickness which is slightly greater than that of the distal ring 31, the central washer 34 and the piezoelectric washers 33, 35. A fine metal linking tube 18 extends around the load sensing sleeve 17 from the proximal ring 36, and on the distal side as far as the fixing ring 15. This linking tube 18 is thus interposed between the load sensing sleeve 17 and the internal wall 44 of the receiving housing 14. The linking tube 18 has a proximal extremity 30 which is fixed rigidly to the proximal ring 36 of the load sensing sleeve 17 by at least one peripheral weld 54, and a distal extremity 29 which is fixed rigidly by at least one peripheral weld 55 to the proximal extremity 28 of the fixing ring 15, preferably in a recess which is made in the wall 19 of the latter and faces radially towards the exterior to avoid any excess thickness. Because of the excess radial thickness of the proximal ring 36 of the load sensing sleeve 17, a radial gap is made between the piezoelectric washers 33, 35, the washer 34 and the distal ring 31 of the load sensing sleeve 17 on the one hand, and the linking tube 18 on the other hand. Similarly, the linking tube 18 is sufficiently fine for a radial gap to be made throughout its axial length, between its cylindrical wall facing the exterior radially and the internal wall 44 of the receiving housing 14 of the plug body 13 facing it. In this way, the linking tube 18 does not come into contact with the plug body 13.

The linking tube 18 thus connects the proximal extremity 37 of the load sensing sleeve 17 to the fixing ring 15, and thus to the plug body 13. But since this link transfers the point of support of the proximal extremity 37 of the load sensing sleeve 17 to the fixing ring 15, the compression stresses which are generated in the load sensing sleeve 17 are in fact representative of the shear loads, which are generated by the axial movements of the heating rod 11, between the proximal portion 50 of the heating rod 11 in contact with the receiving sleeve 16 and the fixing ring 15. Also, since the two axial extremities of the load sensing sleeve 17 rest respectively on the heating rod 11 (more precisely on the metal tube 59 of the heating rod 11) and on the plug body 13, in zones which at least approximately face each other radially, the signals which the load sensor sleeve 17 supplies are not perturbed by deformation of the cylinder head, the plug body 13 or other intermediate elements, except the linking tube as explained below.

The linking tube 18, which is very fine, has some elasticity in axial traction, retracting the proximal extremity 37 of the load sensing sleeve 17 in the distal direction, with a predetermined stiffness coefficient K2, the value of which can be adjusted by an appropriate choice of material forming the linking tube 18 and its dimensions. For example, the linking tube 18 is formed of a material chosen from stainless steels with high characteristics, and its thickness (difference between the radius of its external wall and that of its internal wall) is of the order of 0.2 mm. The linking tube 18 is preferably of stainless steel with high characteristics, having a Young's modulus greater than 150 GPa, in particular of the order of 200 GPa, an elastic limit greater than 600 MPa, e.g. of the order of 800 MPa, and a fatigue strength (maximum stress for which the number of cycles without breakage is infinite) of at least 300 MPa, e.g. of the order of 400 MPa. For example, it is of 17-4PH steel or inconel steel.

In the embodiments shown in the figures, the proximal extremity 30 of the linking tube 18 is simply welded to the exterior of the proximal extremity 37 of the proximal ring 36 of the load sensing sleeve 17. It should be noted that, to obtain an appropriate value of this stiffness coefficient K2, it is possible to provide a link from the proximal extremity 30 of the linking tube 18 to the proximal ring 36 of the load sensing sleeve 17, with folding forming a turned-up part towards the interior, and on the distal side this turned-up part extending around the proximal extremity 37 of the load sensing sleeve 17, similarly to the turned-up part 26 of the distal extremity of the receiving sleeve 16. The general functional kinematics of a plug according to the invention are shown in the diagram of FIG. 8.

The linking tube 18 also has at least one opening 56, which is made through its whole thickness from its proximal extremity 30 on part of its height, as far as the central washer 34 of the load sensing sleeve 17, so as to allow the passage of an electrical connection pin 57 which is welded to the exterior of the central washer 34 and extends on the proximal side. This electrical connection pin 57 makes it possible to transmit the signals which the piezoelectric washers 33, 35 generate on the proximal side to an electronic circuit 90 for processing the signal which the load sensing sleeve 17 supplies.

The electrical connection pin 57 is formed at the distal extremity of a flexible connector 71, in the general form of a multilayer band, shown in FIGS. 11 to 13. This connector 71 includes a support layer 72 of an insulating material, which is preferably flexible in flexion and has a first face 73 facing radially towards the exterior of the principal axis 41 of the heating rod, this first face 73 carrying a signal line 74. The signal line is formed of a metallic track (e.g. of copper) which is deposited on said first face 73 and extends longitudinally along the connector, between a distal extremity 75 of the support layer 72 and the electronic circuit 90 for processing the signal which the load sensing sleeve 17 supplies, this electronic processing circuit 90 being carried on a proximal extremity portion of the first face 73. The signal line 74 is connected, via a conductive bushing 77 formed through the thickness of the support layer 72 and at its distal extremity 75, to an extremity stud 78 which is applied on the second face 79, facing radially towards the principal axis 41 of the heating rod, and thus opposite the first face 73 of the support layer 72. The bushing 77 is, for example, filled with conductive adhesive 76. This stud 78, which is of a conductive material (e.g. copper deposited on the face 79) is connected (by welding or a conductive adhesive) to the central washer 34, so that the signal line 74 transmits to the electronic processing circuit 90 the electrical signals which the load sensing sleeve 17 supplies.

The width of the signal line 74 extends only over part of the width of the first face 73, and in the median part of the latter. The first face 73 also carries two conductive earth lines 81 extending along this first face 73 and each side of the signal line 74, and around the bushing 77, so as to form a peripheral screen around this signal line 74. Each conductive earth line 81 is, for example, in the form of a track of conductive material (e.g. copper) which is deposited on the first face 73, and is connected to the electrical earth of the plug body, e.g. at the level of the electronic processing circuit 90. Advantageously, a layer 83 of insulant covers each conductive track (signal line 74 and earth lines 81) which said first face 73 carries, so as to avoid all contact with the internal wall of the plug body facing it. This layer 83 can be in the form of a layer of insulating varnish, which covers the first face 73 entirely.

Said second face 79 of the support layer 72, which faces radially towards the interior, towards the principal axis 41 of the heating rod, carries a conductive earth layer 82. This conductive earth layer 82 is, for example, in the form of a broad track of conductive material which is deposited on the second face 79, at least approximately according to the whole width of the latter, and is connected to the electrical earth of the plug body, e.g. at the level of the electronic processing circuit 90. The width of the support layer 72 as well as the one of the whole flexible connector 71 are offset from the principal axis 41 and extends according a non diametrical cord of the receiving housing. Also, the width of the support layer 72, and thus of the conductive earth layer 82, is as great as possible, in particular greater than that of the signal line 74, and greater than the radius of the cylindrical receiving housing which is formed within the plug body. In this way, the efficiency of the thus formed screening is optimised.

The conductive earth layer 82 is interrupted at its distal extremity 85, at a distance from the stud 78, to avoid any electrical contact with the latter. Preferably, the conductive earth layer 82, on the distal side, does not go beyond the proximal ring 36 of the load sensing sleeve 17. The distal extremity 85 of the conductive earth layer 82 is connected (by welding or a conductive adhesive) to the proximal ring 36 of the load sensing sleeve 17.

The conductive earth layer 82 is thus interposed (radially) between the electrical power supply electrode 12 (axially centred on the principal axis 41) of the heating rod 11 and the signal line 74 for transmitting electrical signals of the load sensing sleeve 17, and thus acts as electrical screening, avoiding all capacitive coupling. Thus the conductive earth layer 82 extends longitudinally along the electrical power supply link of the heating rod and the signal line 74, being arranged between the principal axis 41 and the signal line 74.

The signal line 74 is thus surrounded on all sides by a conductive screen connected to earth: said conductive earth layer 82 forming screening on the interior side, the earth conductive lines 82 forming said peripheral lateral screening, and the metal plug body on the exterior side. The thus formed multilayer flexible connector 71 constitutes an electrical link, called the sensor link 71, extending in the plug body between the load sensor 17 and a proximal portion 84 of the plug body 13, said sensor link 71 being entirely screened.

The electronic processing circuit 90 is advantageously suitable for supplying, on a proximal output terminal of the plug body, a voltage representing the signals supplied by the load sensing sleeve 17, and thus the cylinder pressure. This circuit 90 can be in the form of a charge amplifying integrated circuit. Thus, a glow plug according to the invention constitutes an independent and autonomous unit, which can be manufactured, configured, regulated and certified in the factory, and supplied ready for use on any engine.

Additionally, the plug body 13 consists of multiple distinct metal tubes which are rigidly assembled to extend each other axially, that is a proximal metal tube 95 which is extended axially by the distal metal tube 45. In particular, the proximal tube 95 forms a proximal portion 84 of the plug body 13, which receives the electronic signal processing circuit 90 and various connectors of the glow plug. The threaded portion 43 for mounting the glow plug on the cylinder head of the engine is formed on the external wall of this proximal metal tube 95.

The distal tube 45 has a thickness (difference between its external and internal radii) which is less than that of the proximal tube 95. The proximal tube 95 has, at its distal extremity, a constriction 96 of its external wall forming a recess to receive the proximal extremity of the distal tube 45. Preferably, this receiving constriction 96 has a thickness corresponding to that of the distal tube 45, so that the external walls of the proximal tube 95 and distal tube 45 are continuous with each other at the junction of the two tubes 45, 95, the proximal tube 95 and distal tube 45 both having the same external diameter. The distal tube 45 and proximal tube 95 are joined end to end to each other by laser welding.

The distal tube 45 is made of a first metal alloy, the proximal tube 95 is made of a second metal alloy, and the first metal alloy forming the distal tube 45 has mechanical properties which are superior to those of the second metal alloy forming the proximal tube 95. More particularly, advantageously and according to the invention, the first metal alloy forming the distal tube 45 has a greater elastic limit than that of the second metal alloy forming the proximal tube 95. In particular, advantageously and according to the invention, said metal alloys are chosen to compensate for the reduction of thickness between the proximal tube 95 and the distal tube 45, while providing continuity of the mechanical properties (the elastic limit in particular). Advantageously and according to the invention, the difference of thickness between the distal tube 45 and the proximal tube 95 is such that: $Y1 \times S1 = Y2 \times S2$, where $Y1$ is the elastic limit of the metal alloy forming the proximal tube, $S1$ is the section formed by said thickness of the proximal tube, $Y2$ is the elastic limit of the metal alloy forming the distal tube, and $S2$ is the section formed by said thickness of the distal tube.

For example, the first metal alloy forming said distal tube 45 is of stainless steel with high characteristics, in particular having a Young's modulus greater than 150 GPa, in particular of the order of 200 GPa, an elastic limit greater than 600 MPa, e.g. of the order of 800 MPa, and a fatigue strength (maximum stress for which the number of cycles without breakage is infinite) of at least 300 MPa, e.g. of the order of 400 MPa. For example, it may be of 17-4PH steel or inconel steel. Advantageously the second metal alloy forming said proximal tube 95 may be a stainless steel for rapid machining, e.g. with an elastic limit of the order of 150 MPa.

Such a distal tube 45 of reduced thickness makes it possible, in particular, to increase the available internal space for forming said receiving housing 14, for the same external diameter and for mechanical properties of the unit of the plug body 13 which are essentially unchanged.

Preferably, at least in this embodiment where the load sensing sleeve 17 includes at least one piezoelectric washer 33, 35, the latter is assembled with a preload in axial compression, e.g. of the order of 100 N, to ensure that each piezoelectric washer 33, 35 is always compressed (by the elastic retractions K1 of the turned-up part 26 and K2 of the linking tube 18, which are prestressed), whatever the axial position of the heating rod 11, including in the case of low pressure in the combustion chamber. Consequently, the load sensing sleeve 17 supplies signals representing the variation of the axial compression stress to which it is subjected in the course of the axial movements of the heating rod 11 relative to the plug body 13. This axial compression preload can be obtained by exerting an axial compression load between the fixing ring 15 (which has a shoulder 58 extending radially towards the exterior and facing towards the distal side) and the proximal extremity 30 of the linking tube 18, at the instant of executing the peripheral weld 55 of the distal extremity 29 of the linking tube 18 onto the proximal extremity 28 of the fixing ring 15 (FIG. 3).

FIGS. 2 to 5 show different stages of a process for manufacturing a glow plug according to the first embodiment of the invention.

First the receiving sleeve 16 is fixed around the heating rod 11 by peripheral welding, then the fixing ring 15 is inserted and fixed around the receiving sleeve 16, in the turned-up part 26, by peripheral welding. Then the load sensing sleeve 17 is introduced via the proximal extremity 38 of the heating rod 11 (FIG. 2), until it comes against the proximal extremity of the receiving sleeve 16. The peripheral weld 53 of the distal ring 31 of the load sensing sleeve 17 onto the receiving sleeve 16 is executed. Then the linking tube 18 is introduced, via the proximal extremity 38 of the heating rod 11, around the load sensing sleeve 17. Then the peripheral weld of the proximal extremity 30 of the linking tube 18 onto the proximal extremity 37 of the load sensing sleeve 17 is executed. Then, by axial compression (of the order of 100 N), the peripheral weld of the distal extremity 29 of the linking tube 18 onto the proximal extremity 28 of the fixing ring 15 is executed (FIG. 3). Then the electrical connections of the heating rod 11 (via the electrode 12) and load sensing sleeve 17 (via the pin 57) are executed, and the various elements in the proximal portion of the glow plug (FIG. 4) are assembled. Then, via the distal extremity of the heating rod 11, the distal tube 45 of the plug body 13, which forms the receiving housing 14, is inserted, then the truncated distal extremity washer 47, and the whole is fixed by peripheral welding (FIG. 5).

When the cylinder pressure increases, the heating rod 11 moves slightly axially in translation in the proximal direction, which compresses the load sensing sleeve 17, the piezoelectric washers 33, 35 of which supply the electrical charges representing this compression.

The turned-up part 26 of the distal extremity of the receiving sleeve 16 retracts the heating rod 11 of the distal side against the cylinder pressure, according to the stiffness coefficient K1. This retraction makes it possible to reduce, for the same value of pressure increase, the compression stresses to which the load sensing sleeve 17 is subjected, which increases its working range. It also makes it possible to limit the stresses to which the linking tube 18 is subjected.

The elasticity of the linking tube 18, according to the stiffness coefficient K2, makes it possible to reduce, on the one hand, the load to which the load sensing sleeve 17 is subjected for the same cylinder pressure, and on the other hand the compression stresses to which the turned-up part 26 is subjected. The greater the value of the stiffness coefficient K2, the greater is the stress to which the load sensing sleeve 17 is subjected (for the same cylinder pressure). Also, the elasticity of the linking tube 18 according to the stiffness K2 makes it possible to retain an impermeability membrane (formed by the turned-up part 26) of sufficient thickness (in particular of the order of 0.35 mm), to the advantage of good disposal of calories by thermal conduction via this impermeability membrane, while avoiding this impermeability membrane being subjected to excessive stresses (at the risk of causing deformations in plasticity or deterioration of the membrane) under the effect of differential thermal expansion.

Also, if the linking tube 18 and receiving sleeve 16 are made of the same material, or of materials having the same thermal characteristics, this compensates for the variations of the stiffness coefficients K1 and K2 as a function of temperature. Advantageously and according to the invention, the linking tube 18 and the receiving sleeve 16 consist of the same material, which is chosen from the stainless steels, preferably stainless steels of high characteristics, in particular high elastic limit and high fatigue strength. In particular, advantageously and according to the invention, the linking tube 18 and the receiving sleeve 16 are made the same, of stainless steel with high characteristics, in particular having a Young's modulus greater than 150 GPa, in particular of the order of 200 GPa, an elastic limit greater than 600 MPa, e.g. of the order of 800 MPa, and a fatigue strength (maximum stress for which the number of cycles without breakage is infinite) of at least 300 MPa, e.g. of the order of 400 MPa. For example, they are both of 17-4PH steel or inconel steel.

The choice of the two stiffness coefficients K1 and K2 makes it possible to adjust the pass band of the thus formed mechanical system, e.g. so that it has a first normal mode (fundamental or natural frequency) with axial oscillations greater than 10 kHz. For example, it has been possible to obtain good results with K1=K2≈40 N/µm.

As is seen, a glow plug of standard dimensions is obtained, incorporating a load sensor which supplies signals representing the cylinder pressure in a perfectly reliable and precise manner, not perturbed by the normal modes of deformation of the heating rod 11 or of the electrical power supply electrode 12, or by deformation of the plug body 13 or cylinder head. In practice, it is noticed that the load sensing sleeve 17 is not subjected to temperatures greater than 170° C.

In the second embodiment shown in FIG. 7, the heating rod 11' is not in the form of a simple metal tube, but of a ceramic bar 60 which is set (and fixed by brazing or bracing, i.e. inserted by force with a residual elastic radial stress) into a peripheral metal tube 61 forming the peripheral wall of the heating rod 11' and the section, of diameter equal to 4 mm, of the heating rod 11'. The peripheral metal tube 61 extends axially not only in the receiving housing 14, but also beyond the washer 47 and plug body 13, partly forming the distal portion of the heating rod 11'. The ceramic bar 60 goes axially beyond the peripheral metal tube 61 at both its proximal extremity and its distal extremity. The ceramic bar 60 also incorporates, in a way which is known per se, a resistive component which is supplied with electric current and heats by Joule effect.

The load sensing sleeve 17 then also extends around the heating rod 11', i.e. around the proximal portion 63 of the metal tube 61 and the proximal portion 62 of the ceramic bar 60, in the most distal possible position in the receiving housing 14, directly axially adjoining the fixing ring 15, and thus the mounting bush 48, of the proximal side. In this second shown embodiment, the load sensing sleeve 17 extends slightly beyond the proximal extremity of the peripheral tube 61 of the heating rod 11'. Nevertheless, on the proximal side the load sensing sleeve 17 does not go beyond the proximal extremity of the heating rod 11', which consists of the proximal extremity of the ceramic bar 60. The electrical power supply of such a heating rod is implemented as a winding 70 of a conductive wire which is wound around the proximal extremity of the ceramic bar 60, in electrical contact with the latter. Otherwise, the second embodiment is identical to the first embodiment.

As is seen, the invention is as compatible with a heating rod 11 in the form of a metal tube 59, as with a heating rod 11' in the form of a ceramic bar 60 set in a peripheral metal tube 61.

FIG. 6 shows a variant embodiment of a load sensor sleeve 67 which can be used in a glow plug according to the invention. In this variant, the load sensor sleeve 67 does not include piezoelectric washers, but at least one stress gauge 65 (coiled wire, the electrical resistance of which varies as a function of the deformation), the terminals 68 and 66 of which are connected to an electrical connection pin like the pin 57 described above. In this variant embodiment, the load sensor sleeve 67 can function equally well in axial compression and traction.

The invention can be the subject of numerous variants in relation to the embodiments described above and shown in the figures. In particular, the load sensing sleeve 17 can include a single piezoelectric washer or more than two piezoelectric washers, the proximal extremity of the load sensing sleeve 17 can be welded directly onto the heating rod, etc. Also, it is possible to provide that the axial extremity of the load sensing sleeve connected to the heating rod is its proximal extremity (and not its distal extremity), the distal extremity of the load sensing sleeve being connected to the plug body. The welds can be implemented by laser welding or otherwise.

The invention claimed is:

1. A pressure measuring glow plug for a diesel engine, the glow plug comprising:
   a heating rod having a proximal extremity with an electrical power supply connection;
   a plug body having a receiving housing receiving a proximal portion of the heating rod, the heating rod having a distal portion which extends axially, projecting beyond a distal extremity of the plug body;
   a mounting device for mounting the proximal portion of the heating rod in said receiving housing, the mounting device including a receiving sleeve made of stainless steel, fixed rigidly and impermeably around said proximal portion of the heating rod, having a tubular principal part extending axially in contact with the heating rod, and being arranged to:
      permit axial translation movements of the heating rod relative to the plug body, and
      ensure impermeability between the heating rod and the plug body, in such a way as to delimit a proximal zone of the receiving housing which is not exposed to the atmosphere of a combustion chamber of an engine which receives the glow plug; and
   a load sensing sleeve that extends entirely in said proximal zone of the receiving housing, the load sensing sleeve being adapted to measure pressure in a cylinder of the diesel engine,
   wherein said load sensing sleeve extends axially entirely around the proximal portion of the heating rod,
   wherein the receiving sleeve has a distal extremity portion opposite said proximal extremity of said heating rod, the distal extremity portion being U-shaped and turned radially outwardly and towards said proximal extremity of said heating rod, a distal face of the U-shaped distal extremity portion being adapted to be in contact with a combustion chamber of the cylinder of the diesel engine,
   the distal extremity portion being connected rigidly and impermeably to the plug body, and
   the distal extremity portion being elastically deformable in flexion and having suitable elasticity in flexion to permit the axial translation movements of the heating rod relative to the plug body while ensuring impermeability at the distal extremity of the plug body,
   wherein the tubular principal part of the receiving sleeve has a proximal extremity opposite said distal extremity portion,
   wherein said proximal extremity of the tubular principal part of the receiving sleeve comes into contact with a distal extremity of the load sensing sleeve.

2. Glow plug according to claim 1, wherein the mounting device includes a fixing ring having a first fixing face that is fixed rigidly and impermeably to an internal wall of the receiving housing, said receiving sleeve guiding axial translation of the heating rod, said receiving sleeve having a second fixing face that is fixed rigidly and impermeably around said proximal portion of the heating rod, and
    wherein said U-shaped distal extremity portion of the receiving sleeve is connected to a distal extremity of the fixing ring, the receiving sleeve and the fixing ring being arranged for ensuring impermeability between the heating rod and the plug body at the distal extremity of the plug body.

3. Glow plug according to claim 1, wherein the heating rod is a ceramic bar set in an external metal tube, said receiving sleeve extending around a proximal portion of the external metal tube of the heating rod.

4. Glow plug according to claim 1, wherein the heating rod is a metal tube, said receiving sleeve extending around a proximal portion of this metal tube.

5. Glow plug according to claim 1, wherein said U-shaped distal extremity portion of the receiving sleeve is turned up at an angle greater than 120° and less than 240° relative to said tubular principal part.

6. Glow plug according to claim 5, wherein the angle is of the order of 180°, said U-shaped distal extremity portion of the receiving sleeve having a peripheral tubular ring which extends from the proximal side parallel to said tubular principal part.

7. Glow plug according to claim 1, wherein said U-shaped distal extremity portion has a proximal extremity portion and a linking portion between said proximal extremity portion and said tubular principal part, and wherein said linking portion has, in cross-section in a radial plane, a generally curved form with continuous curvature.

8. Glow plug according to claim 7, wherein said linking portion has, in cross-section in a radial plane, the general form of an arc of a circle.

9. Glow plug according to claim 1, wherein the receiving sleeve has a constant thickness from its proximal extremity to the U-shaped distal extremity portion.

10. Glow plug according to claim 2, wherein the distal extremity of the fixing ring has a receiving recess which is arranged for receiving a proximal extremity portion of said U-shaped distal extremity portion, and wherein said proximal extremity portion of said U-shaped distal extremity portion is welded into the recess of the fixing ring.

11. Glow plug according to claim 2, wherein the heating rod is a ceramic bar set in an external metal tube, said receiving sleeve extending around a proximal portion of the external metal tube of the heating rod.

12. Glow plug according to claim 2, wherein the heating rod is a metal tube, said receiving sleeve extending around a proximal portion of this metal tube.

13. Glow plug according to claim 2, wherein said U-shaped distal extremity portion of the receiving sleeve is turned up at an angle greater than 120° and less than 240° relative to said tubular principal part.

14. Glow plug according to claim 2, wherein said U-shaped distal extremity portion has a proximal extremity portion and a linking portion between said proximal extremity portion and said tubular principal part, and wherein said linking portion has, in cross-section in a radial plane, a generally curved form with continuous curvature.

15. Glow plug according to claim 2, wherein the receiving sleeve has a constant thickness from its proximal extremity to the U-shaped distal extremity portion.

16. Glow plug according to claim 1, wherein said load sensing sleeve includes a distal extremity that extends axially, parallel to the proximal extremity of the receiving sleeve, the receiving sleeve entirely around the proximal portion of the heating rod.

\* \* \* \* \*